US009367275B2

(12) United States Patent
Shiratori

(10) Patent No.: US 9,367,275 B2
(45) Date of Patent: Jun. 14, 2016

(54) RETRIEVING DATA FROM A POSTING SERVER FOR PRINTING

(71) Applicant: SEIKO EPSON CORPORATION, Tokyo (JP)

(72) Inventor: Kohei Shiratori, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/285,762

(22) Filed: May 23, 2014

(65) Prior Publication Data

US 2014/0376039 A1    Dec. 25, 2014

(30) Foreign Application Priority Data

Jun. 25, 2013  (JP) .................................. 2013-133052

(51) Int. Cl.
*G06F 3/12* (2006.01)

(52) U.S. Cl.
CPC ............ *G06F 3/1287* (2013.01); *G06F 3/1204* (2013.01); *G06F 3/1238* (2013.01); *G06F 3/1265* (2013.01); *G06F 3/1268* (2013.01)

(58) Field of Classification Search
CPC ..... G06F 3/126; G06F 3/1293; G06F 3/1287; G06F 3/1265

USPC ......................................................... 358/1.15
See application file for complete search history.

(56) References Cited

U.S. PATENT DOCUMENTS

| 7,886,000 | B1 * | 2/2011 | Polis et al. ..................... 709/203 |
| 2008/0068646 | A1 | 3/2008 | Kobayashi |
| 2009/0119260 | A1 * | 5/2009 | Chopra et al. .................... 707/3 |
| 2010/0302579 | A1 * | 12/2010 | Nuggehalli et al. ......... 358/1.15 |
| 2012/0194864 | A1 | 8/2012 | Oshima et al. |

FOREIGN PATENT DOCUMENTS

| JP | 2001-084191 A | 3/2001 |
| JP | 2008-071257 A | 3/2008 |
| JP | 2012-159914 A | 8/2012 |

* cited by examiner

*Primary Examiner* — Eric A Rust
(74) *Attorney, Agent, or Firm* — Global IP Counselors, LLP

(57) ABSTRACT

A printing control server includes an administration section, an acquisition section, and a printing control section. The administration section is configured to associate a printing device with a user of the printing device and administer the printing device as being associated with the user. The acquisition section is configured to acquire posting data from a service offering server that provides a posting service. The printing control section is configured to control the printing device associated with the user of the acquired posting data to perform printing based on the posting data.

6 Claims, 9 Drawing Sheets

SETTING DATA OF SNS "SERVICE A"         SD

| SNS ACCOUNT OF USER | PRINTER ADDRESS | DEVICE NUMBER | ... |
|---|---|---|---|
| @aaa | xxxxxxxx | EPxxxxx | ... |
| @bbb | xxxxxxxx | EPxxxxx | ... |
| @ccc | xxxxxxxx | EPxxxxx | ... |
| @abc | xxxxxxxx | Pxxxxxx | ... |
| @xzy | xxxxxxxx | Pxxxxxx | ... |
| ⋮ | ⋮ | ⋮ | ⋮ |

RETRIEVING DATA FROM A POSTING SERVER FOR PRINTING

CROSS-REFERENCE TO RELATED APPLICATIONS

This application claims priority to Japanese Patent Application No. 2013-133052 filed on Jun. 25, 2013. The entire disclosure of Japanese Patent Application No. 2013-133052 is hereby incorporated herein by reference.

BACKGROUND

1. Technical Field

The present invention relates to a printing server and a printing system that control printing in a printing device from a user's terminal by using a service offering server which provides a posting service such as a social networking service (SNS).

2. Related Art

Recent years, the users who use the social networking service (SNS) realized by a cloud computing technology are increasing rapidly. The users post texts or files (e.g., image file such as a picture, etc.) to the SNS so that the posting contents can be published for the users who allow browsing.

Further, as a printing system using a cloud computing technology, for example, in Japanese Laid-open Patent Application No. 2001-84191, it discloses a text output support device that performs printing an attached text in a printer by sending an electronic mail in which texts were attached to a mail address set to the printer from the terminal by using an electronic mail function provided in the terminal. Further, for example, in Japanese Laid-open Patent Application No. 2008-71257, it discloses that when a decision is made by the mobile terminal that the reception of the mail information, which was received by the mail server, is not available, the printing system transfers the mail information to the transfer destination printer device. In addition, in Japanese Laid-open Patent Application No. 2012-159914, it discloses a cloud computing system that can print texts or attached file of an electronic mail by sending an electronic mail to the printer.

SUMMARY

However, conventionally, a system in which the user can easily print the posting data, which was posted in the social networking service (SNS) from the portable terminal such as a smartphone, in the printer was not existed so that the user of the SNS cannot print the posting contents in a simple operation.

The present invention was made to solve the aforementioned problem, and the object of the present invention is to provide the printing control server and the printing system that are capable of printing posting data in the printing device for the user when positing from the terminal.

A printing control server according to one aspect includes an administration section, an acquisition section and a printing control section. The administration section is configured to associate a printing device with a user of the printing device and administer the printing device as being associated with the user. The acquisition section is configured to acquire posting data from a service offering server that provides a posting service. The printing control section is configured to control the printing device associated with the user of the acquired posting data to perform printing based on the posting data.

With this structure, the acquisition section acquires the posting data from the service offering server. The printing control section controls the printing device corresponding to the user of the acquired posting data to perform printing based on the posting data. Accordingly, when the user performs postings, the printing device corresponding to the user can perform printing based on the posting data.

In the aforementioned printing control server, it is preferable that the acquisition section is configured to specify at least one of a source and a destination of the posting data to be provided as a condition of the posting data to the service offering server, and to receive offering of posting data that satisfies the condition from the service offering server. For example, when the printing is performed in the printing device corresponding to the user who posted the acquired posting data, it is preferable that the user becomes a source (posting source). Further, for example, when the printing is performed in the printing device corresponding to the user who is the address of the acquired posting data, it is preferable that the user becomes as a destination (posting address). In addition, for example, when the printing is performed in the printing device corresponding to the user who posted the acquired posting data for the destination of the printing control server, it is preferable that the printing control server becomes a destination (posting address).

With this structure, posting data, which satisfies at least one of source and destination of the posting data specified to the service offering server, is provided to the acquisition section from the service offering server. Accordingly, the acquisition section can narrow down to small number of the posting data, which includes necessary data, acquired from the service offering server so as to reduce the processing load of the printing control server.

In the aforementioned printing control server, it is preferable that the printing control section is configured to receive, after sending print data created based on the posted data, at least one of notifications including a receipt notification indicating a receipt of a print instruction, a completion notification indicating completion of printing, and an error notification indicating occurrence of a print error from the printing device, and to post a content of the at least one of the notifications received to the service offering server addressing the user of the terminal which is an origin of the posting data or the printing device that printed the posting data.

With this structure, the printing control section receives at least one of a receipt notification indicating that the print instruction was received, a completion notification indicating that the printing was completed, and an error notification indicating that a printing error was occurred from the printing device after sending the print data, which was generated based on the posting data, to the printing device. The content of the received notification posts to the service offering server for the terminal of posting source or the user of the printing device in which the aforementioned posting data was printed as a destination. Therefore, the person who posted from the terminal or the user of the printing device in which the positing data was printed can recognize at least one of performances such that the print instruction was received in the printing device by posting, the instructed printing was completed, or the instructed printing was error.

In the aforementioned printing control server, the user of the aforementioned posting data is preferably the user who posted the aforementioned posting data.

With this structure, when the user posts, the printing device corresponding to the user can perform printing based on the posting data.

In the printing control server, the user of the posting data is preferably user to whom the posting date is addressed.

With this structure, when posting to the destination of user, the printing device corresponding to the user can perform printing based on the posting data.

In the printing control server, the user of the aforementioned posting data is preferably the user who posted the aforementioned posting data to the printing control server as a destination.

With this structure, when the user posts to the print support server as a destination, the printing device corresponding to the user can perform printing based on the posting data.

The printing system to solve the aforementioned problems is provided with the aforementioned printing control server, and a printing device that is administrated by the administration section of the aforementioned printing control server as being associated with the user.

With this structure, when the postings were made to the service offering server from the terminal, the posting data is acquired to the printing control server from the service offering server, and the printing control section of the printing control server controls the printing device, which is administrated so as to be associated with the user as a source of the posting (sender) or a destination (address), so that the printing is performed based on the posting data. For example, the printing control section generates the print data based on the acquired posting data, and sends the print data to the printing device which is associated with the user who performed postings or became an address. Therefore, the printing device associated with the user can perform printing based on the posting data.

BRIEF DESCRIPTION OF THE DRAWINGS

Referring now to the attached drawings which form a part of this original disclosure.

DETAILED DESCRIPTION OF EXEMPLARY EMBODIMENTS

First Embodiment

Hereinafter, the print support system according to the first embodiment is described in reference to FIGS. 1 to 7.

Figures 1, 2:
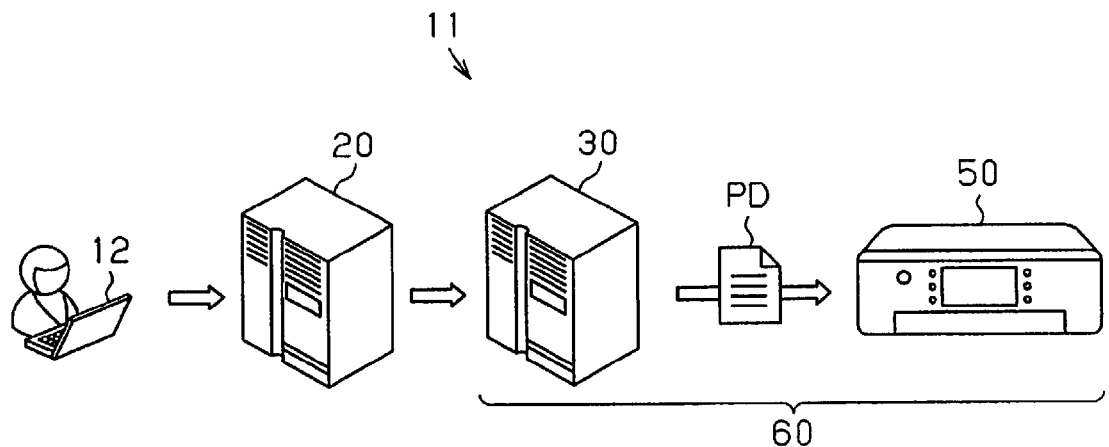
FIG. 1 is a schematic diagram showing a print support system according to the first embodiment.
FIG. 2 is a diagram showing data structure of setting data.

As shown in FIG. 1, the print support system 11 is provided with a user terminal 12, a social networking service server (hereinafter referred to as "SNS server 20"), a printing control server 30, and a printing device 50 instructed by the user. Further, in the present embodiment, the printing system 60 is provided by the printing control server 30 and the printing device 50. The user terminal 12, the SNS server 20, the printing control server 30, and the printing device 50 that configure the print support system 11 are connected to be capable of communicating each other through the Internet 70 (see FIG. 3).

As an example, the user terminal 12 may be a personal computer, and other than that, a portable information terminal PDA (Personal Digital Assistants), a tablet PC, a smartphone, a mobile phone, etc. may be used. Specifically, it may be anything if the user terminal 12 has a function that connects with the SNS server 20. The user preliminary obtains a user account that the terminal 12 accesses to the SNS server 20.

The SNS server 20 provides a social networking service (hereinafter referred to as "SNS"). The SNS denotes a server that is capable of communicating with users each other through the Internet in various formats. For example, the SNS may be "TWITTER (registered trademark)", "FACEBOOK (registered trademark)", "MIXI (registered trademark)", "GREE (registered trademark)", etc. that provide a posting service. The SNS server 20 of the present embodiment provides, for example, a posting service.

Figure 3:
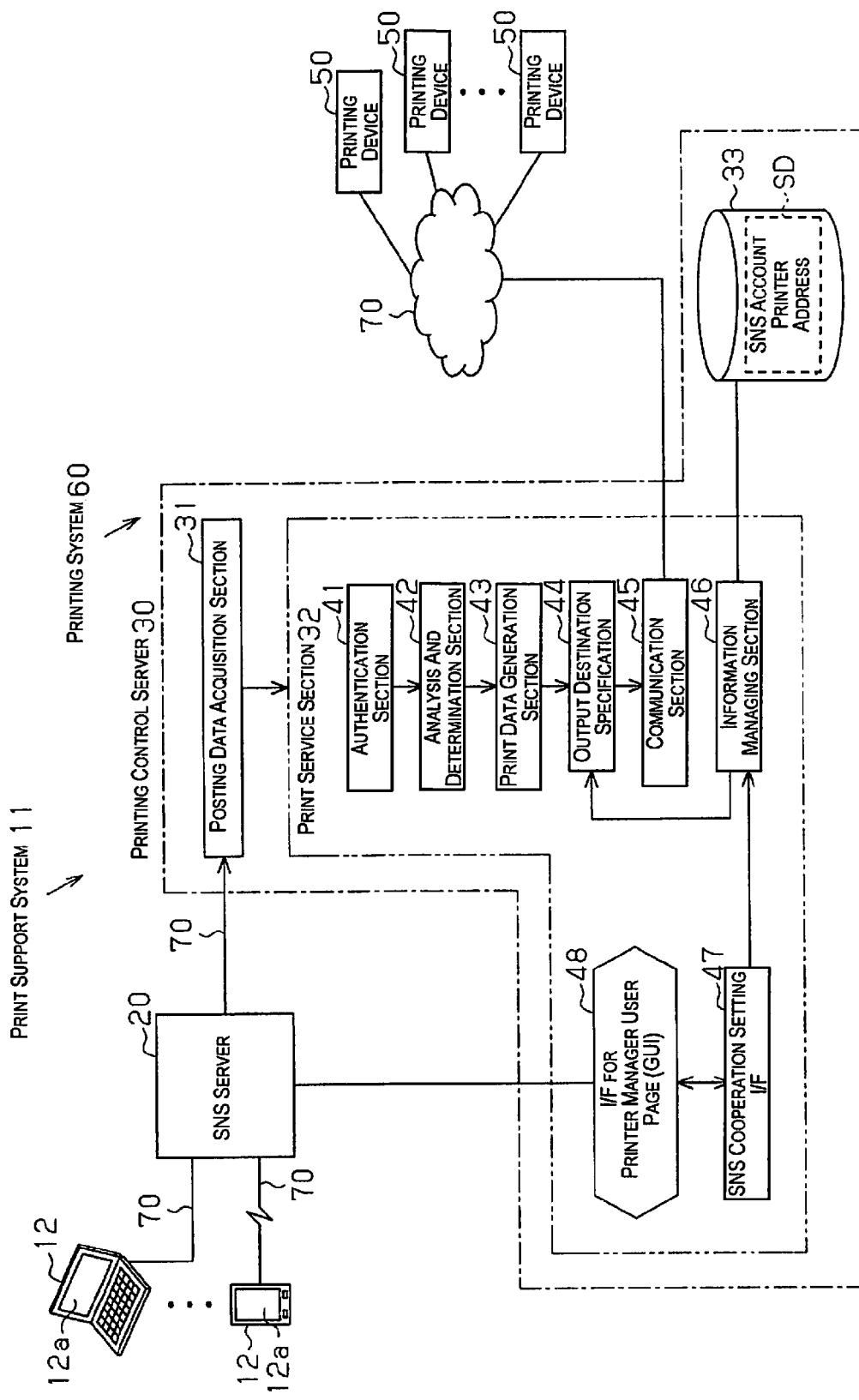
FIG. 3 is a block diagram showing a functional structure of a printing control server.

The printing device 50 is provided with a communication interface (not shown in the drawings) which is capable of performing an Internet communication, and it is connected to the printing control server 30 through the Internet 70 (see FIG. 3). When the user posts to the SNS server 20 from the terminal 12, the printing control server 30 controls the printing device 50, which is specified and associated with the user, to perform a printing process for the posting contents or the print contents corresponding to the posting contents. The printing control server 30 monitors the postings received by the SNS server 20, and when the postings were made from the terminal 12 which was preliminary registered by the user or when the postings were made in the destination of the user (i.e., the posting was addressed to the user), the posting data is acquired from the SNS server 20. The printing control server 30 generates print data PD based on the acquired posting data, and by sending the print data PD to the printing device 50 that was instructed by the user, the printing based on the postings is performed by the printing device 50. In the printing control server 30, setting data SD shown in FIG. 2 in which the user registered for the print support service by using the posting service provided by the SNS server 20 is associated with the printing device 50 specified by the user as a print destination is stored.

FIG. 2 shows an example of the setting data SD stored in the printing control server 30. In the setting data SD, the user account (SNS account) for connecting to the SNS server 20, the address in the Internet for the printing device 50 desired as a print destination (printer address), the device number of the printing device 50, and other predetermined information are included. As described, in the setting data SD, the SNS account of the user and the printer address are registered so as to correspond to each other. Here, the printer address may be, for example, an IP address. The printer address may be an address which is capable of sending the print data to the printing device 50 through the network from the printing control server 30. In the setting data SD, it is considered in the case that family members may commonly use the printing device so that it is possible to set a common printing device (printer address) in association with the plurality of users (SNS accounts).

Next, the schematic structure of the print support system 11 and the functional structure of the printing control server 30 will be described in reference to FIG. 3. As shown in FIG. 3, the print support system 11 is provided with the plurality of user terminals 112, the SNS server 20, the printing control server 30, and the plurality of printing devices 50, and they are connected so as to communicate with each other through the Internet 70. The plurality of printing devices 50 shown in FIG. 3 are specified by the user registered in the printing control server 30 for using the print support service so as to print by using the SNS provided by the SNS server 20. Each user terminal 12 has a display section 12a that is capable of display a posting screen, etc.

As shown in FIG. 3, the printing control server 30 is provided with a posting data acquisition section 31 as an example of acquisition section, a print service section 32, and a storage section 33 that stores necessary information for printing control and includes setting data SD. In the present embodiment, the posting data acquisition section 31 and the print service section 32 are separately configured, and the printing control server 30 is configured by the server system having a plurality of servers. The printing control server 30 may be configured by one server or may be configured by more than or equal to three servers.

The posting data acquisition section 31 specifies the SNS account of the user preliminary registered in the setting data SD in the storage section 33 for the SNS server 20 as a source (sender) or a destination (receiver), and by preliminary requesting to provide the posting data satisfying the specified condition, the SNS server 20 monitors the specified postings. The SNS server 20 monitors the postings satisfied the preliminary requested condition in the received postings, and when the specified postings were made, it has a function to provide the specified posting data to the requesting source. In the present example, the printing control server 30 specifies the SNS account of the user by using, for example, a hash tag, and the SNS account specified by using the hash tag requests to provide the postings set as a source or a destination of the postings. The SNS server 20 always analyzes the received postings, and it determines whether the postings are sent from the SNS account of the user, which is the monitor object, as a source or a destination, and when the posting data is the monitor object, it is sent to the printing control server 30 of the request source as a posting of the print target. As described, the postings as a print target are monitored by the SNS server 20 so that the posting data acquisition section 31 acquires the contents of the postings corresponding to the condition, or the posting data including metadata associated with the postings in real time. The acquired posting data is sent from the posting data acquisition section 31 to the print service section 32.

Here, the SNS server 20 manages "URI (Uniform Resource Identifier) of reference file (e.g. URL)," when there is a link "text of posting text (posting body text)" as contents of the postings, and manages at least "user name", "hash tag", etc. as metadata attached to the postings. The posting data acquisition section 31 acquires these posting contents or metadata.

The print service section 32 shown in FIG. 3 is provided with an authentication section 41 authenticating whether or not the source of the postings acquired by the posting data acquisition section 31 is the user who has already been registered in the print support service, an analysis and determination section 42 determining whether or not it is the print object by analyzing the posting data, and a print data generation section 43 generating print data that is printable in the specified printing device 50 based on the posting data.

Further, the print service section 32 is provided with an output destination specification section 44 that acquires a printer address as an output destination of the print data, and a communication section 45 that sends print data to the printing device 50 specified in the printer address through the Internet 70. Here, the output destination specification section 44 acquires the specified printer address corresponding to the SNS account of the user by reviewing the setting data SD stored in the storage section 33. In the present embodiment, as an example, the printing control section is configured by the analysis and determination section 42, the print data generation section 43, the output destination specification section 44, and the communication section 45.

Further, the print service section 32 as shown in FIG. 3 is provided with a related information managing section 46 that performs registration processing by writing the registration information, which was received from the user terminal 12, to the setting data SD of the storage section 33, and a SNS cooperation setting interface (hereinafter referred to as "SNS cooperation setting I/F 47"). The output destination specification section 44 sends the SNS account of the posting source to the related information managing section 46, and requests to acquire the printer address corresponding to the SNS account. The related information managing section 46 that received this request reviews the setting data SD and sends printer address information corresponding to the SNS account to the output destination specification section 44. In the present embodiment, as an example, the administration section is configured by the related information managing section 46 and the storage section 33.

Further, the SNS cooperation setting I/F 47 provides the user page as an interface for printer manager (hereinafter referred to as "I/F for printer manager 48") to the Internet 70 by cooperating with the SNS server 20. This user page is configured by the Graphical User Interface (GUI) that is capable of performing majority of basic operations by using a lot of graphics. By cooperating with this user page, the registration for the printing control server 30 and the registration for the SNS server 20 can be performed. In FIG. 3, only one SNS server 20 is shown but the printing control server 30 cooperates with a plurality of SNS servers 20 that respectively provide individual SNS.

Next, the registration procedure performed in the user page for the user to receive the print support service will be described in reference to FIG. 4. The user operates the terminal 12 to access the printing control server 30 so that it is possible to display an initial setting screen RP of the user page UP (I/F for printer manager 48) in the display section (monitor).

Figure 4A:
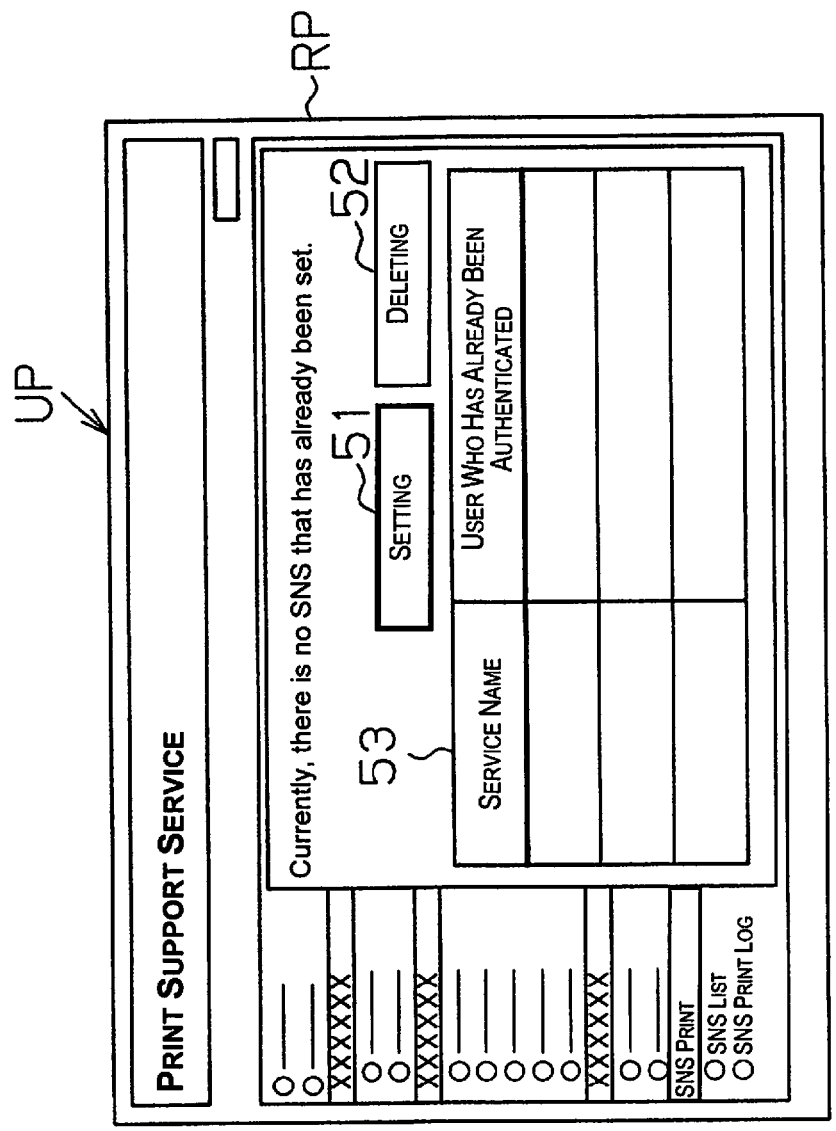
FIGS. 4A to 4D are a diagram showing setting screens for registration to the print support service.

The initial setting screen RP of the user page UP shown in FIG. 4A is the SNS setting screen in order to select the user's desired SNS for setting, and a setting button 51, a deleting button 52, and a display column 53 in which the chart of SNS that has already been set is displayed are provided. When the SNS, which has already been set, is existed, the service name of the SNS, which is printable, and the SNS account of the user, which has already been authenticated, are displayed in the display column 53 but in an example as shown in FIG. 4A, it has not been set yet so that the chart is blank. When the user operates the setting button 51 in the initial setting screen RP, it switches to the SNS selection screen SP as shown in FIG. 4B.

Figure 4B:
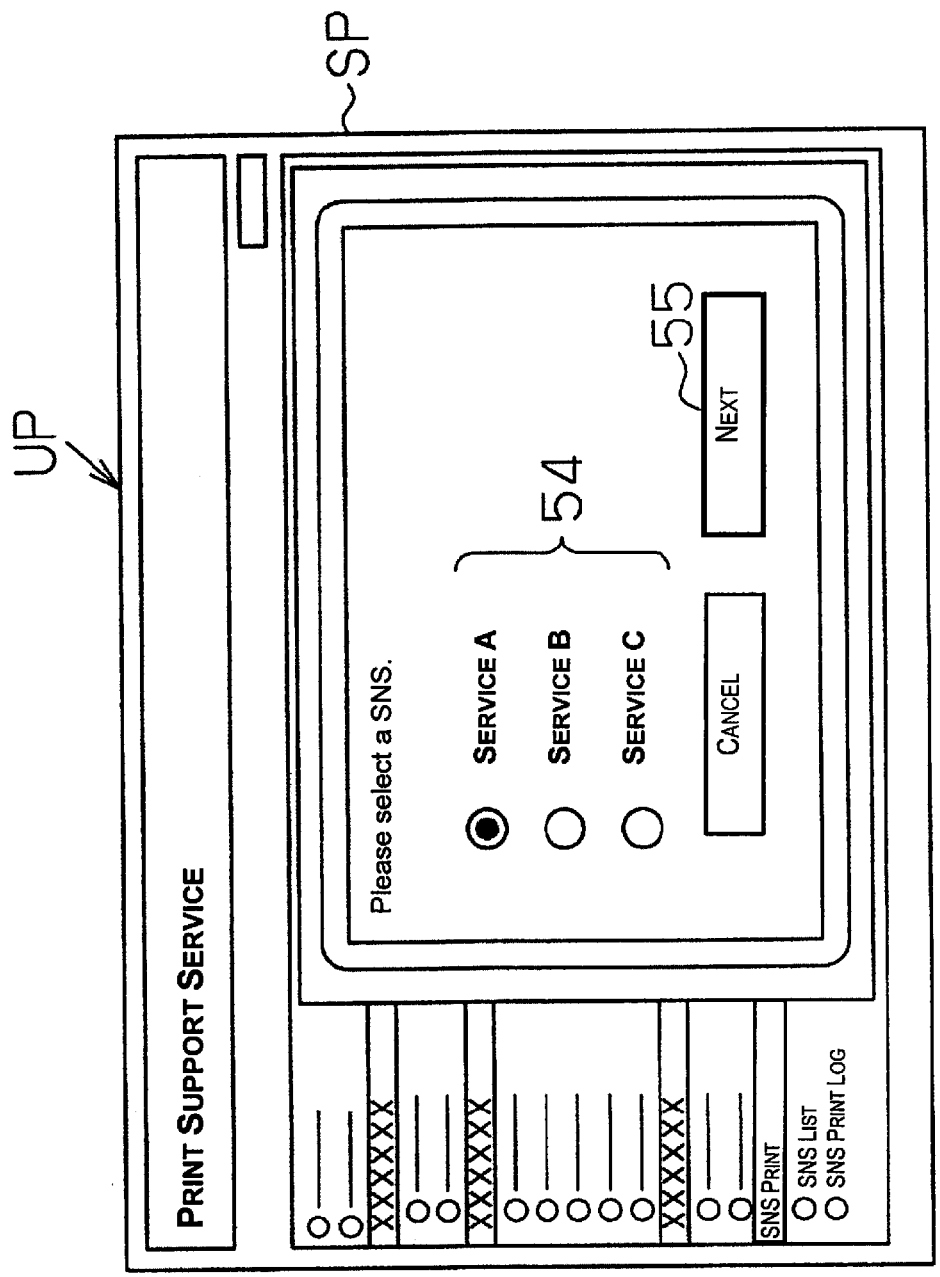

The SNS selection screen SP shown in FIG. 4B is used for the user to select and set the desired SNS from among the plurality of SNSs for use of the print support service. The SNS selection screen SP displays an alternative 54 (e.g., radio buttons) so that among the plurality of SNSs, the user can select one which is desired for use of the print support service. In an example of the SNS selection screen SP shown in FIG. 4B, it displays the alternative 54 so that it is possible to select three SNSs of "Service A", "Service B", and "Service C". In the condition that the desired SNS (selecting "Service A" in the example of the same drawing) was selected among the alternative 54, when the user operates the button 55, the terminal 12 is connected to the SNS server 20 that provides the selected "Service A", and the connection screen CP (login screen) for "Service A" as shown in FIG. 4C is displayed in the display section 12a of the terminal 12.

Figure 4C:
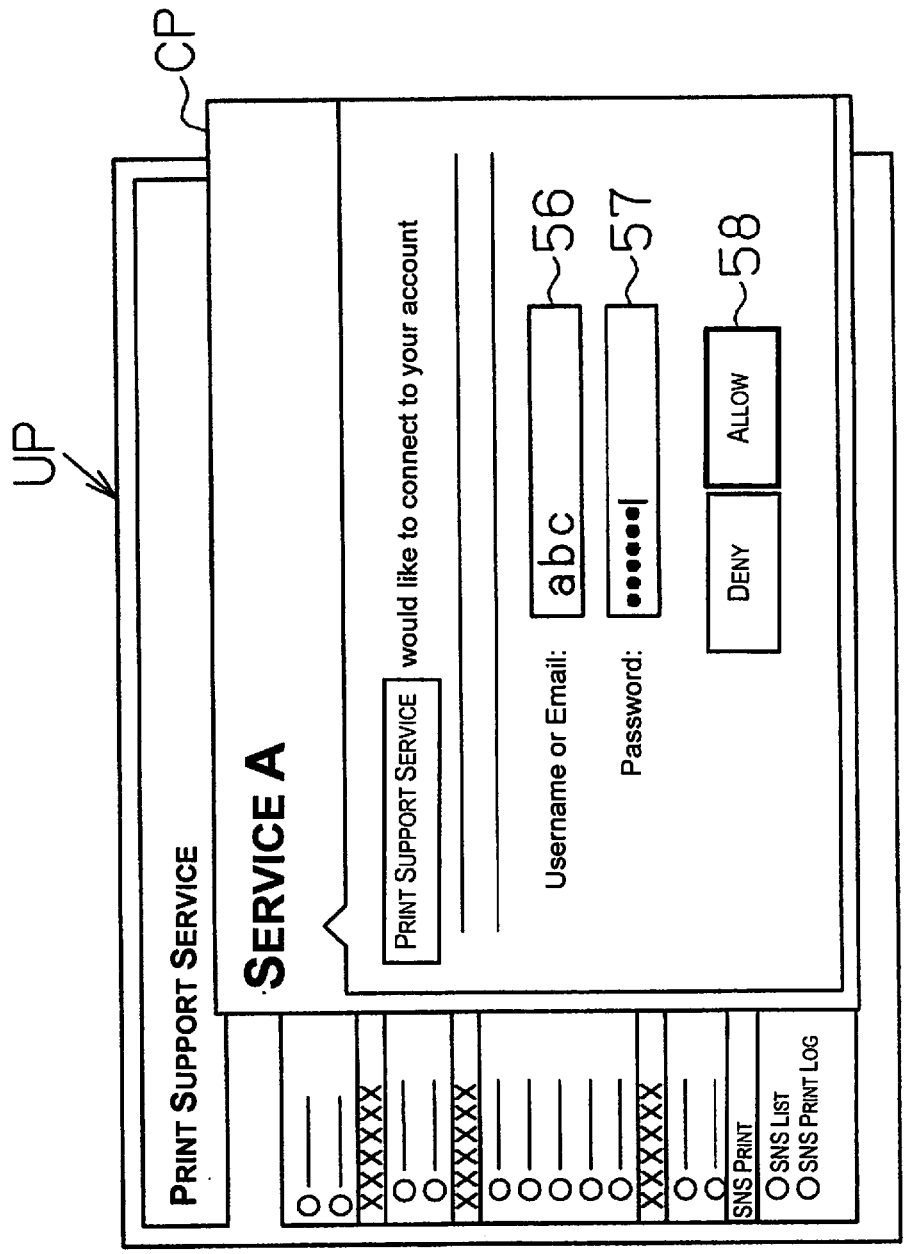
Figure 4D:
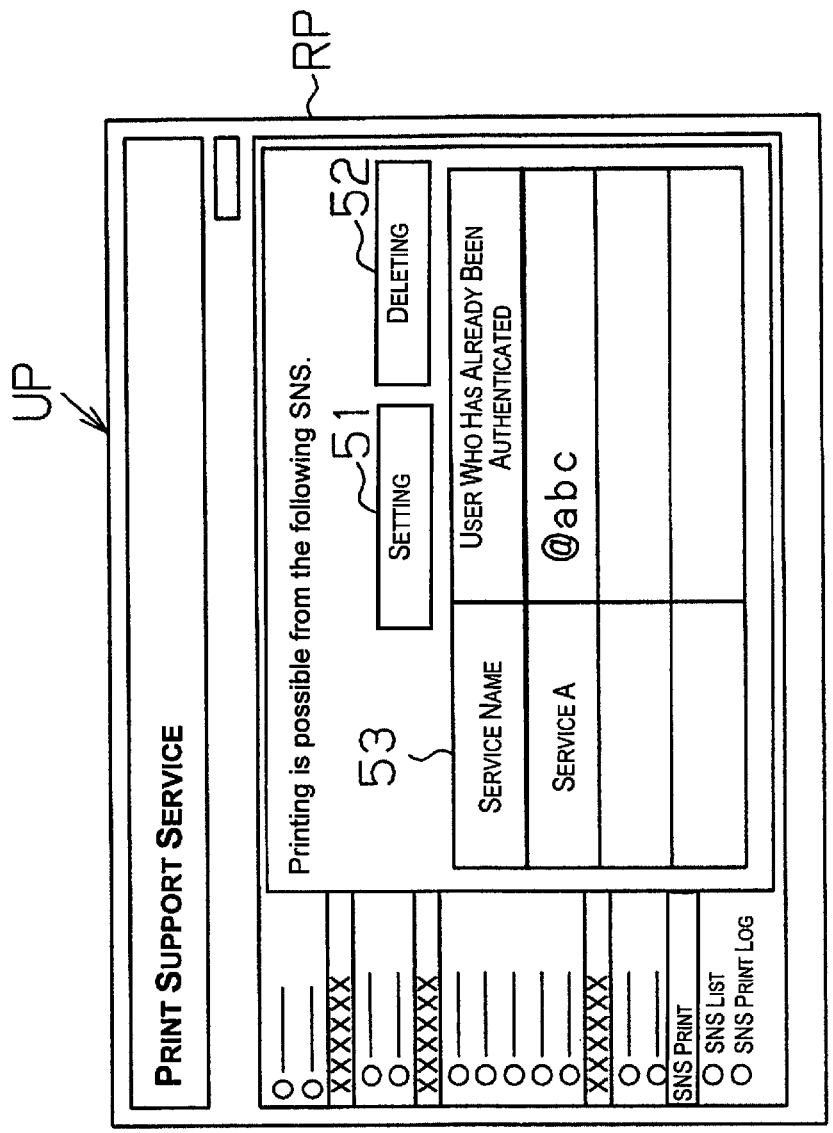

The connection screen CP shown in FIG. 4C is a screen in which the "print support service" requests a connection to "Service A", and the user inputs the SNS account in the user name input column 56 for connecting to Service A and inputs password in the password input column 57 and operates a permission button 58. By sending the input information to the printing control server 30 in this operation, "Service A", which is the SNS that the user uses for the print support service, and the SNS account of the user used in "Service A" are registered in the printing control server 30. This registration information is added to the setting data SD stored in the storage section 33 of the printing control server 30. In the display section 12a of the terminal 12, the setting screen RP shown in FIG. 4D is displayed. In the display column 53 on this setting screen PR, the service name of the SNS "Service A", which is printable, and the SNS account of the user "@abc", which has already been authenticated, are displayed. Further, when a plurality of SNSs, which are printable, are desired, the user operates the setting button 51 in the setting screen RP shown in FIG. 4D and switches to the SNS selection screen SP shown in FIG. 4B, and selects another SNS in the SNS selection screen SP, and performs the setting operation in the same procedure when "Service A" was set.

Further, before or after the registration of the SNS that uses the print support service, the setting information such as a printer address and a device number of the printing device 50 that uses at the time of use of the print support service is set in a different screen of the user page UP (not shown in the drawings). In this way, the registration information such as a SNS account of user, a printer address, a device number, etc. is added in each SNS setting data SD as shown in FIG. 2.

Next, the process for posting data acquired in the printing control server 30 will be described.

Figure 5:
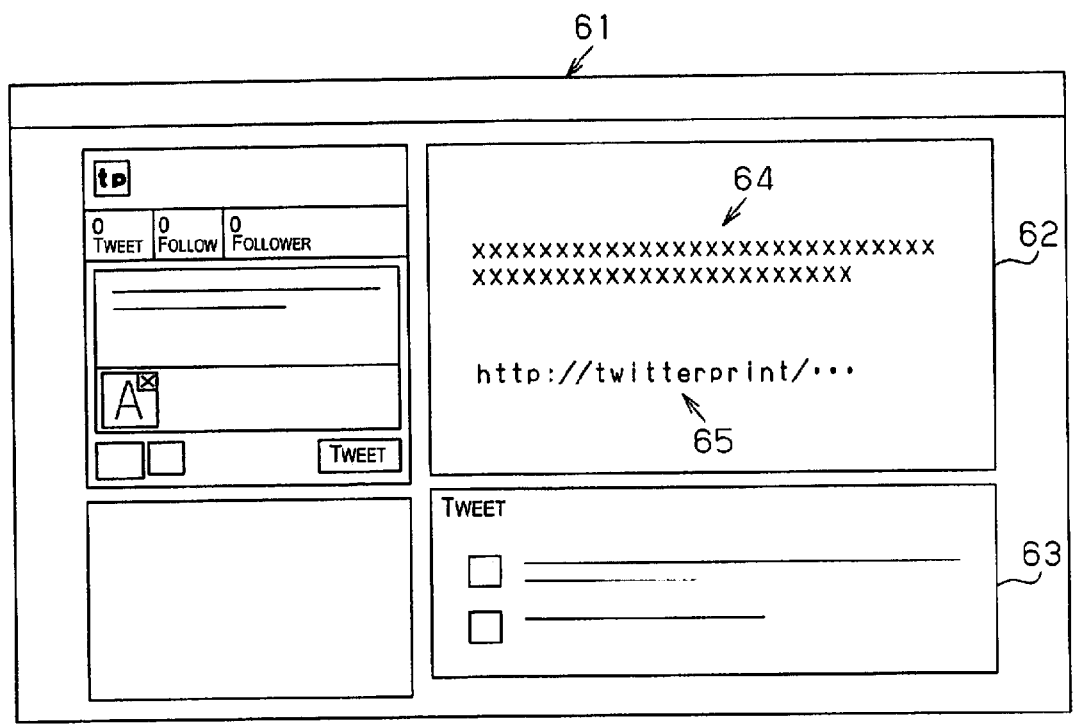
FIG. 5 is a diagram showing an example of posting screen.

FIG. 5 shows an example of the posting screen. When the user who has already been registered in the print support service connects (login) to the SNS server 20 from the terminal 12, a posting screen 61 shown in FIG. 5 is displayed in the display section 12a. As an example, the posting screen displays a posting area 62 for showing the posting contents, and a time-line 63 for showing the posted tweets in time series. By posting in the posting screen 61 of the SNS that has already been registered for use of the print support service by the user who has already been registered for the print support service, it is possible to print the print contents corresponding to the posting contents in the specified printing device 50. The postings are performed as an instruction of printing so that the desired printing can be performed in the specified printing device 50. The user makes a posting text 64 in the posting area 62 of the posting screen 61 displayed in the terminal 12, and if necessary, a link 65 indicating an address of storage location of an image (e.g., Uniform Resource Identifier (URI)) is attached. When the user operates the terminal 12 for posting, the posting data is sent to the SNS server 20 from the user terminal 12.

Among the postings received in the SNS server 20, the printing control server 30 acquires posting data, which includes the source or the destination for the SNS account of the user that has already been registered in the print support service, from the SNS server 20. The printing control server 30 generates the print data from the acquired posting data, and by sending the print data to the user specified printing device 50, the printing is performed in the printing device 50.

Figure 6:
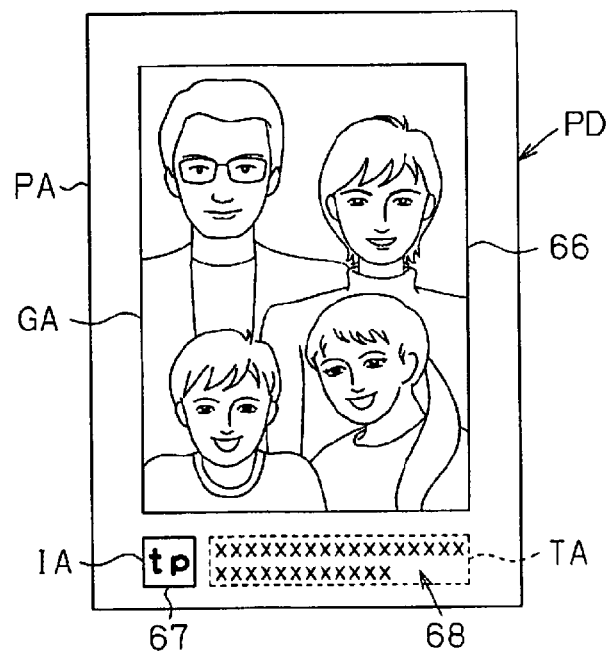
FIG. 6 is a schematic diagram showing print data.

FIG. 6 is an example of the print data generated based on the posting data. The printing control server 30 lays out posting body text, an image, and an icon in the paper area PA of the memory by applying magnification/reduction if necessary, and the printable print data PD in the layout is generated. In the example shown in FIG. 6, the image 66 (e.g., picture, etc.) acquired from the specified address (URI) in the link 65 is arranged in the image area GA in the paper area PA, and an icon 67 and a posting body text 68 of the writer (source) are respectively arranged in an icon arrangement area IA and a text arrangement area TA that are horizontally arranged on the downside. This layout may be preliminary made on the printing control server 30 side, but it is preferable that the user can select a desired print layout among samples of a plurality of print layouts provided by the printing control server 30. Further, other information (e.g., user name, profile, etc.) that can be acquired from the metadata which configures the posting data is arranged in the paper area PA and it may be printed.

Figure 7:
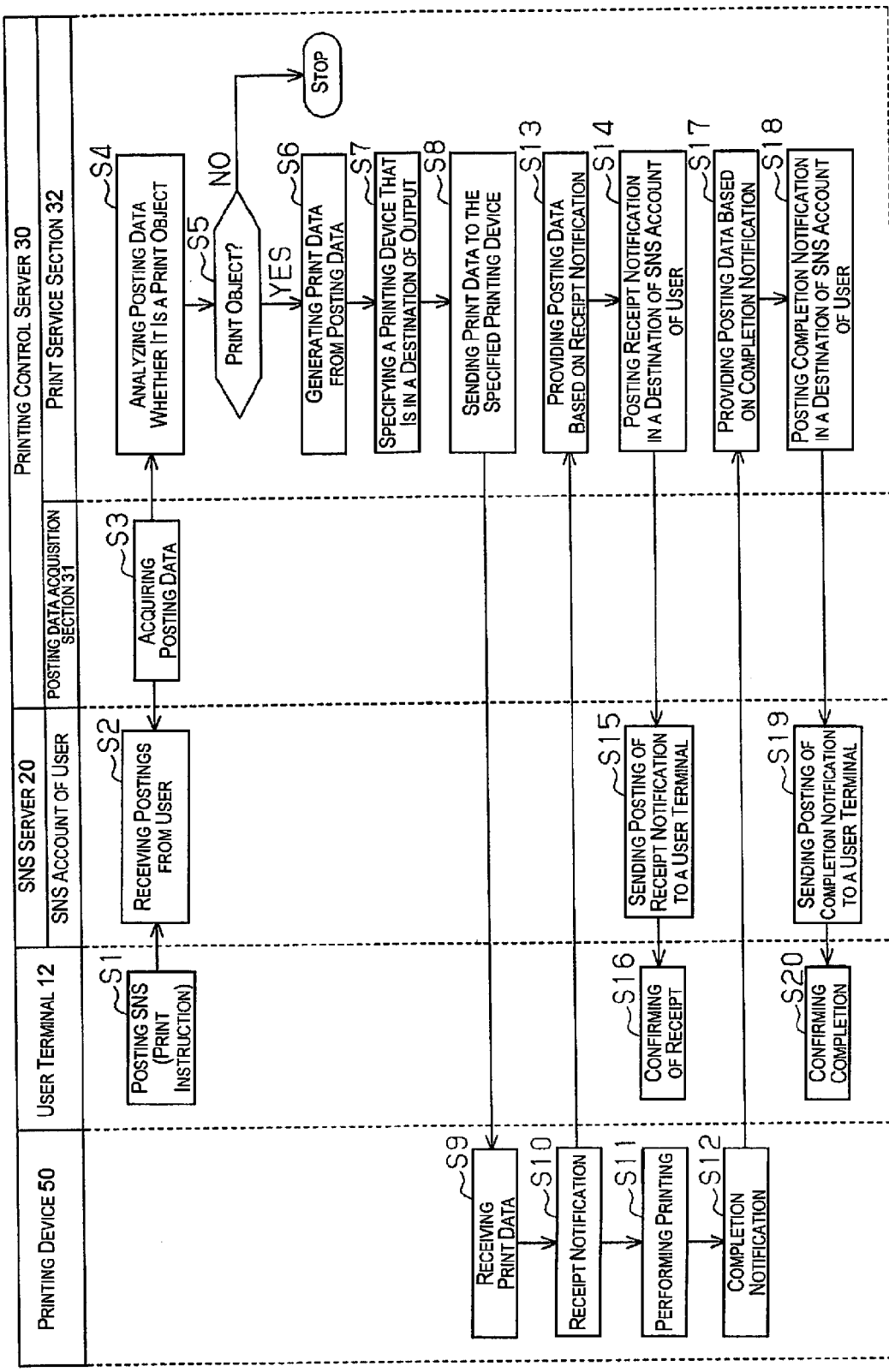
FIG. 7 is a sequence diagram showing a processing flow of the print support system.

Next, the action of the printing control server 30 in the aforementioned configured print support system 11 will be described in reference to FIG. 7. The user preliminary accesses to the user page UP, which is shown in FIG. 4, from the terminal 12, and the selection of the posting service and the acquisition of the SNS account are performed. To avoid printing the postings which are not intended to print, or the postings in the destination of the user which are not intended to print, it is preferable that the SNS account of the user acquired at the time is exclusively used for the print support service. The SNS account of the user may not be exclusive for the print support service. Therefore, in the printing control server 30, the setting data SD (FIG. 2) corresponding between the SNS account of the user and the specified printing device 50 is managed.

The user who uses the print support service provides postings to the SNS server 20. Further, when the user receives an offering of a printed material from another user, the SNS account of the user for use of the print support service is given to another user, and another user posts the contents to be printed in the destination of the SNS account of the user in the terminal 12. Hereinafter, the processing flow from the posting to the printing will be described in reference to FIG. 7.

Initially, in Step S1, posting to the SNS is performed. In the present embodiment, the action of postings from the terminal 12 by the user or another user becomes a print instruction. In detail, the user or another user operates the terminal 12 to connect to the SNS server 20, and the posting screen 61 shown in FIG. 5 is displayed on the display section 12a, and the posting text 64 is provided in the posting area 62, and the link 65 of the URI, etc. of the storage location of the image data is attached if necessary. The postings are sent by operating the control section of the terminal 12. In this case that the user sent the postings, the SNS account of the user is set to the source, and in the case that another user sent the postings, the SNS account of the user is set to the destination.

In Step S2, the SNS server 20 receives postings from the user. Further, the SNS server 20 receives postings to the destination of user from another user.

In Step S3, the posting data acquisition section 31 of the printing control server 30 acquires posting data from the SNS server 20. For the SNS server 20, the posting data acquisition section 31 preliminary requests (specifies) the SNS account of the user set for the source or the destination of postings as a condition of postings to be provided. When the postings are provided to the SNS account of the user that is the monitor object as a source or a destination by the SNS server 20, the postings are sent to the printing control server 30. The posting data acquisition section 31 acquires the postings from the user or the contents of the postings to the destination of the user and the postings associated with the metadata as the posting data. The posting data acquired by the posting data acquisition section 31 is sent to the print service section 32.

In Step S4, the analysis and determination section 42 analyzes the posting data whether it is the print object. That is, the analysis and determination section 42 analyzes the posting data whether at least one of the SNS account of the source and the SNS account of the destination of the acquired postings has been registered in the setting data SD as the user. In the present example, when the SNS account of the user has been set in the source or the destination of the postings, the postings become the print object.

In Step S5, the analysis and determination section 42 determines whether or not the posting data is the print object. The analysis and determination section 42 stops the processing when the SNS account of the user has not been set in either the source or the destination of the postings and the posting data is not the print object. On the other hand, the analysis and determination section 42 proceeds to Step S6 when the SNS account has been set in either the source or the destination of the postings and the posting data is the print object.

In Step S6, the print data generation section 43 generates the print data from the posting data. In detail, when the posting text 64 in the posting data and the posting data include the link 65 such as URI, etc., the print data generation section 43 acquires the file reviewed from the specified URI in the link 65. The print data generation section 43 lays out the posting text and the print object component such as an image in the posting data on the paper area PA developed on the memory, which is not shown in the drawings, in accordance with the preliminary determined layout or in accordance with the layout that the user selected from the plurality of layout samples. In detail, the print data generation section 43 arranges the image 66 acquired from the URI in the image area GA of the paper area PA, and arranges the icon 67 in the icon arrangement area IA, and arranges the posting body text 68 in the text arrangement area TA. At this point, the image 66, the icon 67, and the posting body text 68 are magnified and reduced to be fit in appropriate size in each corresponding arrangement area. The print data generation section 43 generates the print data PD based on the data after the layout.

At the time of producing the print data PD, the print data generation section 43 reviews the setting data SD managed by the related information managing section 46, and acquires the device number of the printing device 50 connected to the SNS account of the user, and generates the print data PD using a print command which can be interpreted by the printing device 50 specified from the device number. The print data may not include the print commando and may be data in a predetermined data format (extensions "JPEG", "BMP", "GIF", "PNG", "TIF", "PDF", etc.) incorporated in a predetermined area. In this case, the printing device 50 of the destination converts the received data including the text data and the image data to the CMYK data by a data converter provided in the inside of the device, and performs printing.

In Step S7, the output destination specification section 44 specifies the printing device 50 as an output destination. That is, the output destination specification section 44 acquires a printer address (e.g., IP address) of the printing device 50 corresponding to the SNS account of the user by reviewing the setting data SD managed by the related information managing section 46, and specifies the printing device 50 as the output destination by the printer address.

In Step S8, the communication section 45 sends the print data to the specified printing device 50. That is, the communication section 45 sends the print data PD to the specified printer address destination. The communication section 45 notifies an instruction for the acquisition of the print data to the printing device 50, and the printing device 50 may acquire the print data in response to the notification by accessing to the printing control server 30.

In Step S9, the printing device 50 receives the print data PD.

In Step S10, the printing device 50 sends the receipt notification as an acknowledgement of receipt of the print data PD to the printing control server 30 through the Internet 70. The receipt notification is received to the communication section 45 of the printing control server 30 and is acquired to the print service section 32.

In Step S11, the printing device 50 performs printing based on the print data PD.

In Step S12, when the printing device 50 completes printing, the completion notification notifying that the printing was completed is sent to the printing control server 30. The completion notification is received to the communication section 45 of the printing control server 30 and is acquired to the print service section 32.

The print service section 32 of the printing control server 30 performs the following processes based on the receipt notification and the completion notification received from the printing device 50 after sending the print data PD to the printing device 50.

In Step S13, the print service section 32 provides posting data in posting contents as texts which is reportable to the user so as to notify the receipt based on the receipt notification. At this time, the receipt notification may be a predetermined bit of the binary data that is discriminable for a type of the notification, or it may be text data that is a text to notify the receipt of the print instruction.

In Step S14, the print service section 32 sends the posting data for receipt notification to the SNS server 20 in an address for the SNS account of the user corresponding to the printer address of the printing device 50, which is the source of the receipt notification.

In Step S15, the SNS server 20 sends the received posting data for receipt notification to the user terminal 12 specified in the SNS account.

In Step S16, the user terminal 12 displays the received posting data of the receipt notification in the display section 12a. By reviewing the positing of the receipt notification displayed on the display section 12a, the user can confirm that the instruction of printing was received in the printing device 50. After that, the completion notification that was sent when the printing device 50 completed the printing is received in the printing control server 30.

In Step S17, the print service section 32 provides posting data based on the completion notification. At this point, the completion notification may be a predetermined bit of the binary data that is discriminable for a type of the notification, or it may be text data that is a text to notify the completion of printing. The print service section 32 generates posting data for completion notification as a posting body text, which is reportable to the user so as to notify that printing was completed.

In Step S18, the print service section 32 posts the completion notification to the destination of the SNS account of the user corresponding to the printing device 50. That is, the posting data for completion notification is sent to the SNS server 20 from the printing control server 30.

In Step S19, the SNS server 20 sends the received posting of completion notification to the user terminal 12.

In Step S20, the posting of completion notification received in the user terminal 12 is displayed in the display section 12a, and the user can confirm that the printing was completed in the printing device 50.

When an error was occurred during performing the printing after the receipt notification, the printing device 50 sends the error notification, which reports the occurrence of error, to the printing control server 30. The print service section 32 of the printing control server 30 provides posting data based on the received error notification. The print service section 32 sends the posting data for error notification to the SNS server 20 in an address for the SNS account of the user corresponding to the printing device 50. The posting for error notification is sent to the user terminal 12 from the SNS server 20. The user terminal 12 displays the received posting of the error notification in the display section 12a, and the user can recognize the occurrence of error in the printing device 50. The printing control server 30 may post at least one of the receipt notification, the completion notification, and the error notification to the destination of the SNS account of another user.

According to the aforementioned first embodiment, the following effects can be obtained.

(1) The printing control server 30 manages the setting data SD corresponding between the printing device 50 and the SNS account of the user (e.g., user discrimination information) by the related information managing section 46. The printing control server 30 controls the printing device 50 corresponding to the SNS account of the user to perform printing based on the posting data in which the SNS account of the user is set as a source. Accordingly, when the user posts from the terminal 12, the printing based on the posting data can be performed in the printing device 50 which was specified by the user. Further, when the user posts from the SNS account of the user as a source, the printing can be performed in the printing device 50 specified by the user so that it is not required to set user discrimination information such as a SNS account in the printing device 50 after purchase.

(2) The printing control server 30 controls the printing device 50 corresponding to the SNS account of the user, which is the address of the posting, to perform printing based on the posting data in which the SNS account of the user is set as a destination (address). Accordingly, when a third party posts to the destination of the user, the printing based on the posting data can be performed in the printing device 50 corresponding to the user as an address. Further, when the posting was made by the third part to the SNS account of the user as an address, the printing can be performed in the printing device 50 specified by the user so that it is not required to set user discrimination information such as a SNS account to the printing device 50 after purchase.

(3) The posting data acquisition section 31 can acquire the postings specified by that the SNS account of the user was set as a source or a destination from the SNS server 20 when the SNS account of the user has been instructed to the SNS server 20 as a monitor object. Accordingly, the processing load when the printing control server 30 receives the posting data, and the processing load when a posting of the print object is selected from among the received postings can be reduced. Further, the posting data acquisition section 31 acquires the posting data, in which the user is set as a source or a destination, from the SNS server 20 in real time.

(4) The print data generation section 43 acquires the posting text 64 in the posting data and the image of the reference file in the destination of the link 65, and generates the print data PD by using a print command which can be interpreted by the printing device 50 specified from the device number corresponding to the SNS account of the user or the model information. Accordingly, the printing based on the posting can be appropriately performed by the printing device 50.

(5) When the printing control server 30 receives a receipt notification from the printing device 50, the posting, which is reportable for the reception, is sent to the SNS account destination of the user so that in the display section 12a of the terminal 12, the user can confirm that the printing device 50 received the print instruction. Further, when the printing control server 30 receives a completion notification from the printing device 50, the posting, which is reportable for the completion, is sent to the SNS account destination of the user so that in the display section 12a of the terminal 12, the user can confirm that the printing was completed in the printing device 50. In addition, when the printing control server 30 receives an error notification from the printing device 50, the posting, which is reportable for the content of error notification, is sent to the SNS account destination of the user so that in the display section 12a of the terminal 12, the user can recognize that the error was occurred in the printing device 50.

Second Embodiment

Figure 8:
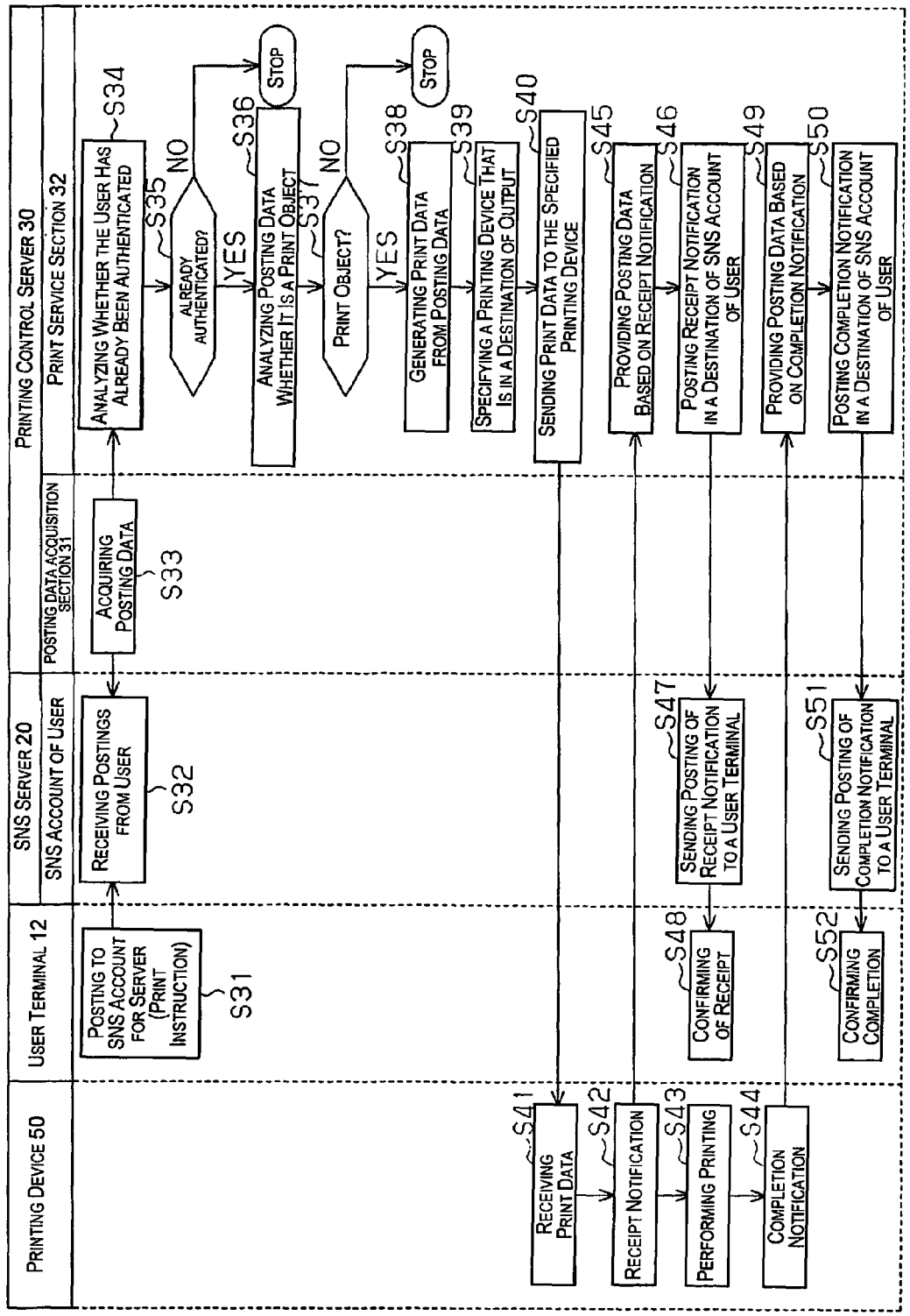
FIG. 8 is a sequence diagram showing a processing flow of a print support system according the second embodiment.

A print support system according to the second embodiment will be described in reference to FIG. 8.

The print support system 11 in the present embodiment is basically configured in the similar manner as the first embodiment shown in FIGS. 1 to 6, and the contents of the processing performed in each functional part of the printing control server 30 are different from the first embodiment.

The printing control server 30 acquires necessary SNS account for use of the SNS provided in the SNS server 20. Hereinafter, the SNS account for the printing control server is referred to as simply "SNS account for server".

When the user prints by using the print support service, the posting is made to the destination of the SNS account for server from the terminal 12. The SNS server 20 sends the received posting data to the printing control server 30 in its address. The posting data acquired by the posting data acquisition section 31 is basically posting by the user for the print object.

Hereinafter, the function of the printing control server 30 in the print support system 11 of the present embodiment will be described in reference to FIG. 8.

In Step S31, the postings are made from the user terminal 12 to the SNS account destination for server. In the present embodiment, the action of the postings from the terminal 12 by the user becomes the print instruction. It is in the same manner as Step S1 in FIG. 7 except the address of the postings is the SNS account destination for server.

In Step S32, the SNS server 20 receives postings from the user.

In Step S33, the posting data acquisition section 31 of the printing control server 30 acquires the posting data. The posting data acquisition section 31 specifies the SNS account for server to the SNS server 20 by using, for example, a hash tag, and preliminary requests the production of postings in which the SNS account for server is set to the destination (address of the postings). When the postings that the SNS account for server as a monitor object is used as an address were made, the postings are sent to the printing control server 30 by the SNS server 20. The posting data acquisition section 31 acquires the contents of the postings for the destination of the SNS account for server and the metadata attached with the postings as the posting data. The posting data acquired by the posting data acquisition section 31 is sent to the print service section 32.

In Step S34, the authentication section 41 analyzes the posting data whether the source of the posting data is the authenticated user. That is, the authentication section 41 analyzes the posting data and analyzes whether the SNS account of the user who posted has been registered (authenticated) in the setting data SD.

In Step S35, the authentication section 41 determines whether or not it has already been authenticated. In detail, the authentication section 41 determines that it has already been authenticated if the SNS account of the source has already been registered as the user in the setting data SD. When it has not already been authenticated, the processing stops. On the other hand, when it has already been authenticated, it proceeds to Step S36.

In Step S36, the analysis and determination section 42 analyzes the posting data whether it is the print object. That is, the analysis and determination section 42 analyzes the posting data whether the SNS account, which is set as a destination of the acquired postings, is the SNS account for server. In the present example, when the SNS account for server is set for the destination of postings, the postings become the print object.

In Step S37, the analysis and determination section 42 determines whether or not the posting data is the print object. When the posting data is not set the SNS account for server as an address and is not the print object, the processing stops. On the other hand, when the posting data is set the SNS account for server as an address and is the print object, it proceeds to Step S38.

In Step S38, the print data generation section 43 generates the print data from the posting data. The print data generation processing by the print data generation section 43 is performed in the same manner as Step S6 in FIG. 7.

In Step S39, the output destination specification section 44 specifies the printing device 50 as an output destination. That is, the output destination specification section 44 reviews the setting data SD managed by the related information managing section 46, and acquires the printer address (e.g., IP address) of the printing device 50 corresponding to the SNS account of the user that is the source of the postings, and specifies the printing device 50 as an output destination by the printer address.

In Step S40, the communication section 45 sends the print data to the specified printing device 50. That is, the communication section 45 sends the print data PD to the specified printer address destination. In the same manner as Step S8, the communication section 45 notifies to instruct an acquisition of the print data to the printing device 50, and the printing device 50 may acquire the print data by accessing to the printing control server 30.

Hereinafter, the processes of Step S41 to Step S52 are performed in the same manner as the processes of Step S9 to Step S20 shown in FIG. 7. Accordingly, the receipt notification when the printing device 50 received the print data PD is sent to the user terminal 12 through the SNS server 20 as posting from the printing control server 30, and it is displayed in the display section 12a. Therefore, the user can confirm that the print instruction performed by the action of posting was received by the printing device 50 (S42, S45 to S48).

Further, the completion notification when the printing was completed by the printing device 50 is sent to the user terminal 12 through the SNS server 20 as posting from the printing control server 30, and it is displayed in the display section 12a. Accordingly, the user can confirm that the printing was completed by the printing device 50 (S44 to S52). In addition, an error notification is displayed in the user terminal 12 so that the user can recognize an error of the printing device 50.

According to the second embodiment as described above, the same effects (1) to (5) of the first embodiment can be obtained and in addition, the following effect can be obtained.

(6) The printing control server 30 acquires the posting data, which is the SNS account for server as an address, from the SNS server 20, and the printing based on the posting data is performed by the printing device 50 corresponding to the SNS account of the user which is set as the source of posting. Therefore, when the user posts to the SNS account for server as an address from the terminal 12, the printing based on the posting data can be performed by the printing device 50 specified by the user. Further, when the user posts to the SNS account for server as an address, the printing can be performed by the printing device 50 specified by the user so that it is not required to set the user discrimination information such as a SNS account for printer in the printing device 50 after the purchase.

(7) In the first embodiment, the situation of printing for the postings of the user or the postings of the destination of user that the user does not intend to print was easily occurred. However, in the second embodiment, the SNS account of the printing control server 30 is specified as an address of postings so that this avoids the situation of printing for the postings that the user intended for just posting but the user does not intend to print, and the printing for the postings that the user intends to print can be performed.

The aforementioned embodiments may be modified to the following configurations.

The method for specifying the posting data of print object by the printing control server 30 may be employed in the both first embodiment and second embodiment. That is, the postings from the user (the source is the postings of the user account), the postings of the destination of the user (the destination is the postings of the user account), and the postings of the destination of the printing control server (the destination is the postings of the account for server) are the print object. Further, in the first embodiment, only the postings from the user may be the print object, or only the postings for the destination of the user may be the print object. In addition, the postings for the destination of the printing control server may be the print object, or the postings for the destination of the user and the postings for the destination of the printing control server 30 may be the print object. Also, in these configurations, the printing based on the posting data from the terminal 12 can be performed in the printing device 50 without setting the SNS account in the printing device 50.

In the aforementioned embodiments and the modified examples, the printing control server 30 acquires all postings from the SNS server 20, and the method for selecting and acquiring the postings from the monitor object user, the postings of the destination of the monitor object user, and the postings of the destination of the printing control server among the all postings may be employed.

The user discrimination information may be indirectly corresponded with the printing device. For example, the SNS account and the name may be corresponded to each other. Also, in this configuration, the printing device 50 corresponding to the user can be specified.

In each of the aforementioned embodiments, it also determines whether or not a print instruction character string (e.g., hash tag "#print") in the posting text 64 of the posting data is included, and it may be a configuration that when the condition satisfies that the print instruction character string is included, it becomes the print object. In this case, the posting data acquisition section 31 may preliminary request to the SNS server 20 to provide the source or the destination of the user, and the posting data including the print instruction character string. Further, in addition to the print instruction character string (e.g., "#print"), a condition specification character string to specify a print condition may be included in the posting data. For example, in the case of printing 3 copies, as one example of the print instruction character string "#print" and the print condition, the hash tag "#3" of "number of copies" is included. In addition, other than the print condition, a print size condition such as a character size, an image size, etc. may be set in the character string (e.g., has tag).

In the aforementioned first embodiment, in the both cases of the user who made postings and the user who is the address of postings, the printing based on the print data was performed in the printing device corresponding to the user, but it may be a configuration that in one of the cases only, the printing based on the posting data may be performed in the printing device corresponding to the user. For example, when it is the configuration that the printing is performed in the printing device corresponding to the user who made postings, by posting from the user, the printing based on the posting data, which was posted by the user, can be printed in the printing device 50. On the other hand, when it is the configuration that the printing is performed in the printing device corresponding to the user who is the address of postings, by providing the postings to the destination of the user from the third party, the printing based on the posting data from the third party can be performed in the printing device 50 specified by the user.

It may be a configuration that the use can register the SNS account of the destination of postings which are the print object, or the SNS account of the source of postings, which are the print object, among the postings which are the address of the user. Further, it may be a configuration that the print support service may be turned ON/OFF in the user page. According to these configurations, the postings that the user does not intend to print are avoided as a print object as much as possible, and the postings that the user intends to print can be printed in the specified printing device 50.

In the aforementioned first embodiment, the configuration that another user may be the third party other than the registrant as long as the destination of the user has already been registered in the setting data SD may be replaced to the configuration that another user may be limited to the registrant who has already been registered in the setting data SD.

It may be a configuration that not all but at least one or two of the receipt notification, the completion notification, and the error notification is sent as a posting to the user terminal 12 which is the source of postings, or the destination of the user corresponding to the printing device 50 that performs printing based on the posting data. For example, only the receipt notification and the completion notification among the three notifications may be sent as a posting. Further, only the receipt notification among the three notifications may be sent as a posting. In addition to at least one of the three notifications, another notification may be sent as a posting. As another notification, for example, an ink residual amount notification, a print progress state report notification, etc. may be provided.

In the first and second embodiments, the user discrimination information discriminating whether the source of the postings (posting source) is the user, or in the first embodiment, the address of postings is the user is not limited to the user account (SNS account) in the SNS, and it may be a nickname that does not duplicate other users in the printing control server 30.

When the posting text 64 and the link 65 are existed in the posting data, the image of the reference file is the print object, but only the posting text or only the image may be the print object.

When the printing device corresponding to the user is not existed, an error message may be displayed in the user terminal 12.

The printing device having at least a print function that forms an image on a medium is acceptable, and for example, a printer provided with only the print function or a multifunction device may be acceptable. Also, the printing device is not limited to the inkjet type, and it may be a dot impact type, and a laser type. In addition, the printing device may be a serial printer, a lateral type printer, a line printer, or a page printer.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing system comprising:
a printing control server that
associates a printing device with a user information that specifies a user and administers the printing device as being associated with the user information, the user information being used to access a posting service in which a posting data is published and shared between a posting user posting the posting data and a receiving user to whom the posting data is addressed,
acquires the posting data that corresponds to the user information and is transmitted from a service offering server that provides the posting service, via network, using the user information,
sends print data based on the posting data to the printing device via a network and controls the printing device associated with the user information of the user of the acquired posting data to perform printing based on the print data automatically in response to acquiring of the posting data, according to posting of the posting data to the posting service by the user as an instruction of printing,
receives, after sending the print data created based on the posting data, at least one of notifications including a receipt notification indicating a receipt of a print instruction, a completion notification indicating completion of printing, and an error notification indicating occurrence of a print error from the printing device, and posts a content of the at least one of the notifications received to the service offering server addressing the user of the terminal which is an origin of the posting data or the user of the printing device that printed the posting data.

2. The printing system according to claim 1, wherein the printing control server specifies at least one of a source and a destination of the posting data as a condition of the posting data to be provided to the service offering server, and receives offering of posting data that satisfies the condition from the service offering server.

3. The printing system according to claim 1, wherein the user of the posting data is the posting user who posted the posting data.

4. The printing system according to claim 1, wherein the user of the posting data is the receiving user to whom the posting date is addressed.

5. The printing system according to claim 1, wherein the user of the posting data is the posting user who posted the posting data to the printing control server as a destination.

6. The printing system according to claim 1, further comprising:

the printing device as recited in claim 1, the printing device being administrated by the printing control server associating the print device with the user information.

* * * * *